March 3, 1953  E. VILLARREAL  2,630,479
ELECTRIC MAGNETIC THERMOSTAT FOR TYPE MELTING MACHINES
Filed Nov. 12, 1948  2 SHEETS—SHEET 2
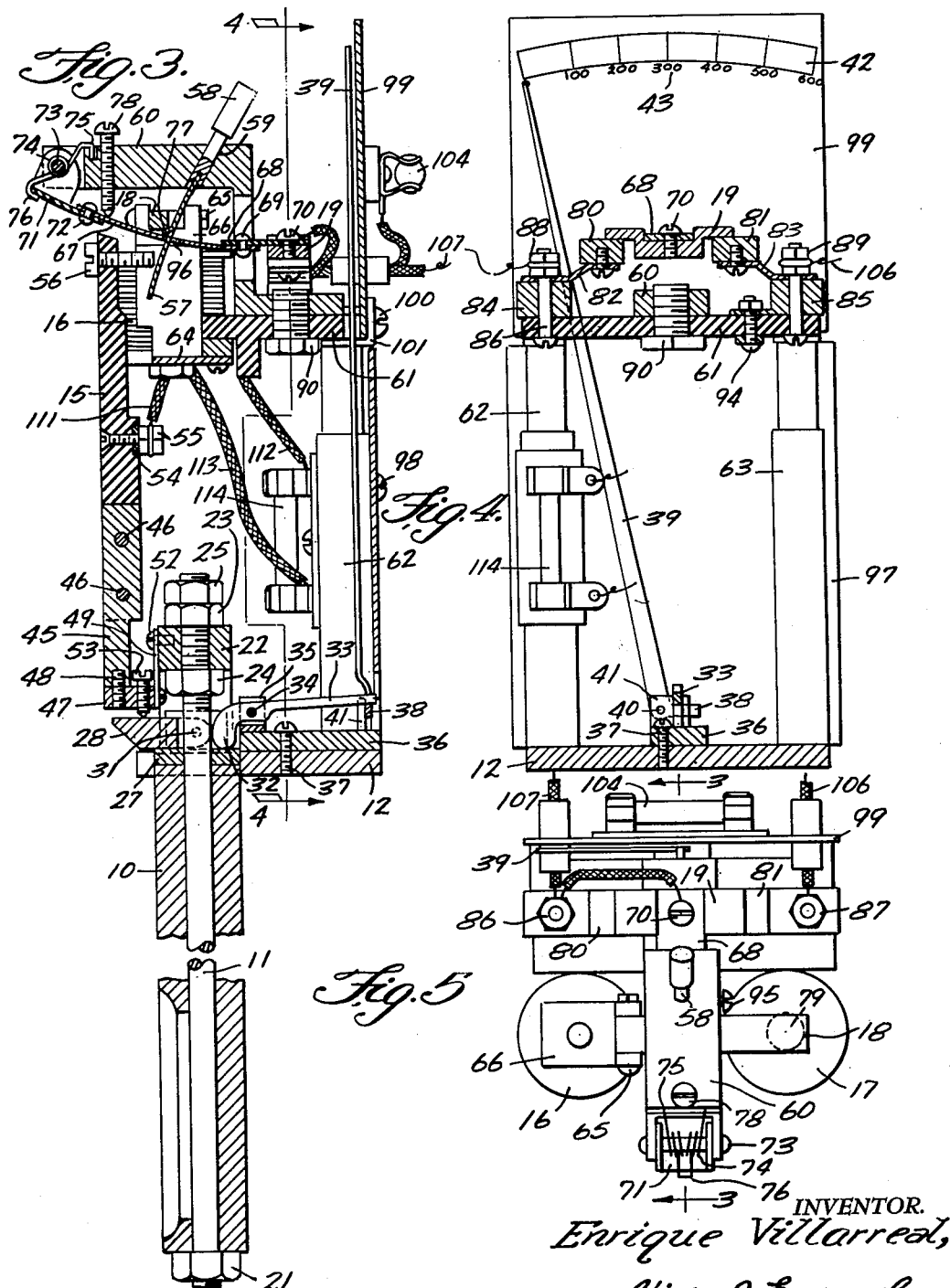
INVENTOR.
Enrique Villarreal,
BY Victor J. Evans & Co.
ATTORNEYS Patented Mar. 3, 1953

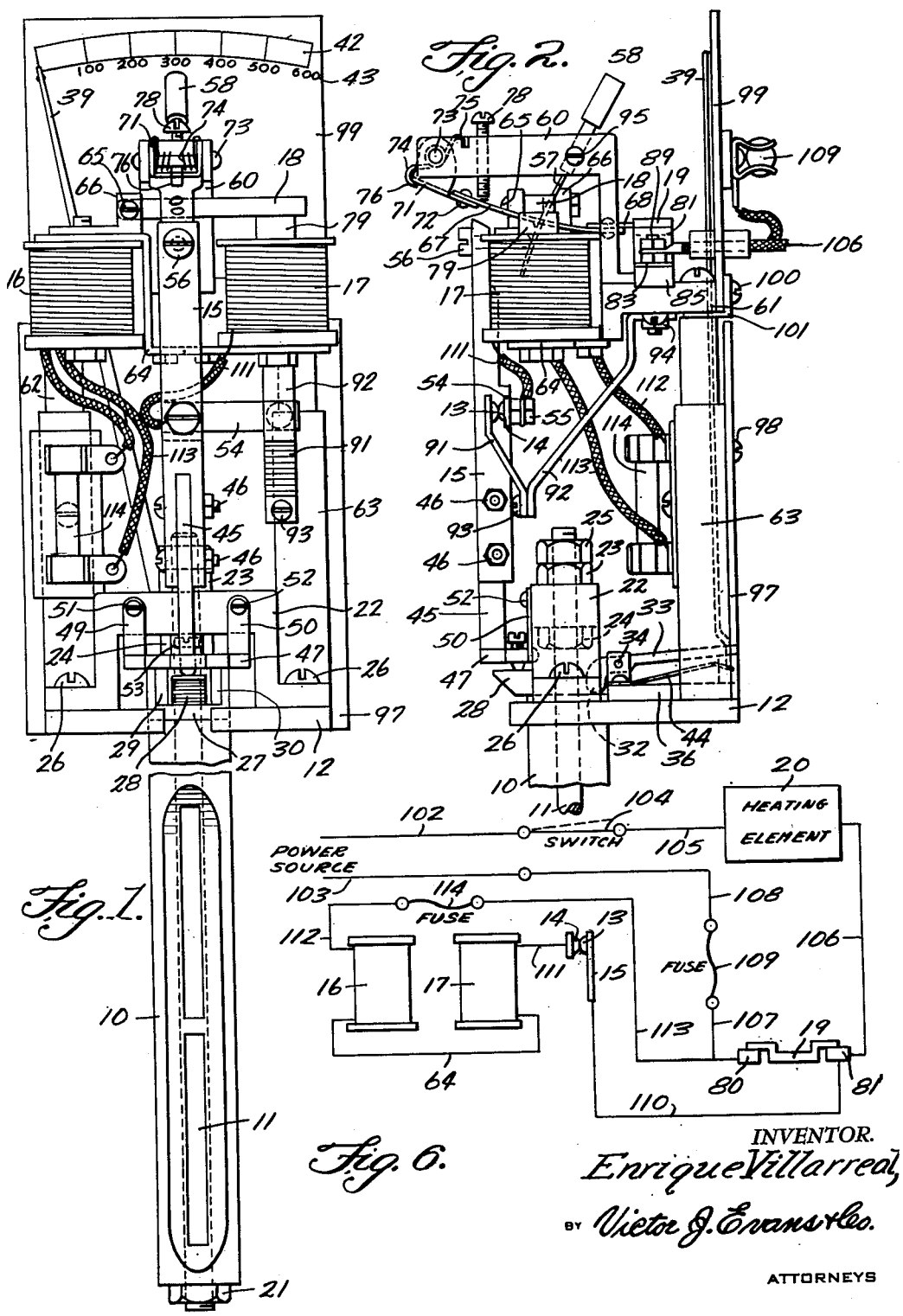

2,630,479

UNITED STATES PATENT OFFICE 2,630,479

ELECTRIC MAGNETIC THERMOSTAT FOR TYPE MELTING MACHINES

Enrique Villarreal, Mexico City, Mexico

Application November 12, 1948, Serial No. 59,438

4 Claims. (Cl. 175—375)

This invention relates to combination electro-magnetic and thermostatic control devices for melting pots of type setting machines or for machines or devices for other purposes, and in particular the invention relates to an automatic switch actuated by an expansion bar, which also actuates a pointer, wherein expansion of the bar opens the switch and as the bar cools, the switch is closed completing a circuit through solenoids that close contacts in a main circuit to electric heating elements of the melting pot.

The purpose of this invention is to provide means for maintaining comparatively constant temperature in metal melting pots and in which the control means may readily be adjusted to vary the temperature of the metal.

This application is a continuation, in part, of my co-pending application, filed February 15, 1946, with Serial Number 647,895, and now abandoned for Electro-Magnetic Thermostat for Type Melting Machines.

Various devices, and particularly thermostatic devices of different types have been provided for controlling the temperature of the molten metal in melting pots and while these devices operate eventually, it takes considerable time for the thermostat to cool sufficiently to permit contact to complete the circuit after the circuit has been opened. With this thought in mind, this invention contemplates a control device having electro-magnetic actuating means in combination therewith wherein the controls actuate to instantly close the circuit to the electric heating elements of the melting pot when the temperature of metal in the melting pots comes to a predetermined degree.

The object of this invention is, therefore, to provide an automatic control device for maintaining constant temperature in melting pots particularly in type setting machines wherein as the material in the melting pot reaches a predetermined degree, a circuit is broken through a solenoid that opens a switch in the circuit to the melting pot so that the heat is instantly turned off and all circuits are broken until the temperature of the material in the melting pot drops to a predetermined degree.

Another object of the invention is to provide a control device for heating elements of metal melting pots in which visible means is provided for indicating the temperature of the metal in the melting pot.

Another object of the invention is to provide a combination thermostatic and electro-magnetic control for heating elements of metal melting pots in which the electro-magnetic device actuates instantly to break the circuit as the temperature of the metal in the melting pot reaches a predetermined degree and also actuates instantly to again apply the heat when the temperature drops to a predetermined degree.

A further object of the invention is to provide in combination an electro-magnetic and thermostatically controlled switch for maintaining constant temperatures in metal melting pots which is of a comparatively simple and economical construction.

With these and other objects and advantages in view, the invention consists of the new and useful combination, construction and arrangement of parts as hereinafter more fully described, set forth in the claims appended hereto, and disclosed in the accompanying drawings forming part hereof, wherein:

Figure 1 is a view showing a front elevation of the switch with the cover removed and with part of the expansion bar broken away;

Figure 2 is a view showing a side elevation of the switch with the housing removed and with part of the expansion bar broken away;

Figure 3 is a vertical cross-section through the switch taken substantially on line 3—3 of Figure 5;

Figure 4 is a sectional view through the switch taken on line 4—4 of Figure 3;

Figure 5 is a plan view of the switch showing the parts in elevation, and;

Figure 6 is a wiring diagram illustrating the circuit of the device.

Referring now to the drawings wherein like reference characters denote corresponding parts, the control switch of this invention includes a thermo-responsive or tubular expansion bar 10 carried by a rod 11 from a base 12 and the expansion of the bar 10 opens contacts 13 and 14 through an arm 15 and as the contacts open a circuit to solenoids 16 and 17 is broken so that an arm 18 is released which raises a contact bar 19 that opens a circuit to the heating element 20 of a melting pot.

The element 10 is secured on the bar 11 by a nut 21 and the bar 11 is rigidly mounted in an inverted U-shaped bracket 22 by nuts 23 and 24 and a lock nut 25. The bracket 22 is secured to the base 12 by screws 26 and the upper end of the element 10 is provided with a ring 27 that engages the trigger 28 that is pivotally mounted in upwardly extended ears 29 and 30 of the ring 27 by a pin 31.

The ring 27 also engages an end 32 of a lever 33 which is pivotally mounted on the base 12 by a pin 34 in a clip 35 on a bar 36. The bar 36 is secured to the base 12 by a screw 37. The opposite end of the lever 33 engages an extension 38 of a pointer 39 which is pivotally mounted on the bar 36 by a pin 40 in a clip 41 and the upper end of the pointer is in registering engagement with the graduated scale 42 which is provided with numerals 43 to indicate the rise in temperature in the melting pot. A spring 44 is provided on the bar 36 and positioned with the outer end under the extended end 38 of the pointer whereby the pointer is maintained in the position illustrated in Figures 1 and 4 when metal in the melting pot is cool.

The arm 15 is provided with a bifurcated lower end in which a bar 45 is secured by bolts 46 and the lower end of the bar 45 is secured to a horizontally disposed bar 47 by a screw 48. The bar 47 and the arm 15 to which the bar 47 is attached through the bar 45 are carried by spring elements 49 and 50 which are mounted on the outer face of the bracket 22 by screws 51 and 52. The bar 47 is provided with an adjusting screw 53, the lower end of which extends downward to engage the upper surface of the trigger 28.

On the upper part of the arm 15 is a laterally disposed arm 54 that carries a contact 55 on which the point 14 is positioned and as the element 10 expands it moves the trigger 28 upward which, in turn, through the adjusting screw 53, actuates the arm 15 about the spring elements 59 and 50 and moves the contact 14 laterally away from the contact 13 thereby breaking a circuit to the solenoids 16 and 17. The arm 15 being suspended by the spring elements 49 and 50 is suspended with a swinging action and upward movement caused by pressure on the lower end of the screw 53 swings the lower end of the arm outwardly and the upper end inwardly whereby the contact 14 moves laterally away from the contact 13 and the inner end of the screw 56 engages the spring 57. The arm 15 is formed of insulating material and the upper end is provided with an adjusting screw 56 which engages a spring 57 that extends downward from a frictionally mounted pin 58 that is positioned in an opening 59 in a support 60 on an upper base member 61 that is supported above the base 12 by posts 62 and 63. With the parts arranged in this manner, the position of the arm 15 may be adjusted so that the points 13 and 14 moving normal to their contact faces separate exactly when the temperature of metal in the melting pot reaches a predetermined degree.

The opposite terminals of the solenoids 16 and 17 are connected by a Z-shaped bar 64 as shown in Figure 1, and the arm 18 is pivotally mounted by a pin 65 in a bracket 66 on the bar 64. The arm 18 is positioned over an arcuate flat spring steel arm 67, as shown in Figure 3, and the contact bar 19 is mounted on the outer end of the arm 67 through a plate 68, the plate being attached to the arm 67 by a rivet 69 and to the bar 19 with a screw 70. The arm 67 is attached to a channel shaped clip 71 by a rivet 72 and the clip 71 is pivotally mounted in the recess in the outer end of the support 60 by a pin 73. The arm 67 is resiliently urged wherein the outer end, carrying the bar 19 is held upwardly when the arm is released by a spring 74 on the pin 73, one end of the spring 74 being held in a recess 75 in the support 60 and the other end 76 being positioned under the clip 71. Upward movement of the arm 67 is restrained by a projection 77 on the spring 57 and the position of the arm 67 is also governed by an adjusting screw 78 in the support 60. When the solenoids are de-energized, the bar 19 is held in contact with the contacts 80 and 81 by the projection 77 on the spring 57 and the circuit is, therefore, held closed until the expansion of the outer tube 10 actuates the arm 15 to open the contacts 13 and 14 whereby the inner end of the screw 56 moves the spring 57 over until the projection releases the arm 67 wherein the arm 18 is raised by the action of the spring in the lower part of the arm 67 so that it is separated from the core 79 of the solenoid 17 and in this position, the contact bar 19 is separated from the contacts 80 and 81 which are suspended by spring clips 82 and 83 from blocks 84 and 85 on the upper insulated base 61. The blocks and clips are held by bolts 86 and 87 respectively and contact bars 88 and 89 extend from the upper ends of the posts formed by the bolts 86 and 87, respectively.

The arm 15, the upper base 61 and also the bars 68 are formed of insulating material.

The support 60 is mounted on the upper base 61 and is secured thereto by a bolt 90. The contact point 13 is also carried by the upper base 61 being mounted thereon through arms 91 and 92 which are connected by a screw 93 and the upper end of the arm 92 is connected with the upper base 61 by a bolt 94. A set screw 95 is provided in the support 60 to lock the spring 57 in the adjusted position through the member 58. The spring 57 extends through an opening 96 in the arm 67, as shown in Figure 3. A plate 97 may be secured to the posts 62 and 63 by screws 98 and an upper plate 99 on which the graduated scale 42 is positioned is attached to the upper insulating base 61 by screws 100 through clips 101.

As illustrated in the wiring diagram, shown in Figure 6, current is applied to the device through wires 102 and 103 with the wire 102 provided with a main switch 104 and connected to a heating element of the metal melting pot by a wire 105. From the heating element, which is indicated by the numeral 20, the current is connected to the contact 81 by a wire 106. The contact 81 is connected to the contact 80 by a bar 19 and the contact 80 is connected to the wire 103 by wires 107 and 108 with a fuse 109 connecting the wires. The contact point 13 on the arm 15 is connected to the contact 81 by a wire 110 and the contact 14 is connected to the solenoid 17 by a wire 111. The solenoids are connected by the bar 64 and the opposite terminal of the solenoid 16 is connected to the wire 107 through wires 112 and 113 with a fuse 114 in these wires.

The contact bar 19 is elevated when the device is not in use so that the points 80 and 81 are separated and when the main switch 104 is closed, a circuit is completed through the solenoids passing from the wire 102 through the wires 105, 106, 110 and 111 to the solenoids and through the wires 112, 113, 107 and 108 back to the wire 103. As soon as the solenoids are energized, the bar 19 is drawn downward by the bars 18 to close the contact points 80 and 81 and this circuit will remain closed until the temperature of metal in the melting pot reaches a predetermined degree wherein the expansion bar 10 will raise the arm 15 to break the circuit through the contact points 13 and 14. When the temperature drops to a predetermined degree, the circuit will be completed through the points 13 and 14 and thereby through the heating element. This cycle of continuously opening and completing circuits will be continued to maintain a standard constant temperature in the melting pot. The projection 77 on the spring 57 serves to hold the bar 19 selectively closed.

It will be understood that modifications may be made in the design, arrangement and other parts without departing from the spirit and scope of the invention.

What is claimed is:

1. A temperature control comprising a stationary contact, a movable contact positioned to engage the stationary contact, means for maintaining said movable contact in engagement with said stationary contact, a thermo-responsive element for actuating the movable contact to disengage the stationary contact as the thermo-responsive element expands, a main operating circuit and an auxiliary circuit, a switch connected in the said main operating circuit, a solenoid connected in the auxiliary circuit for holding the switch of the main operating circuit closed, and resilient means urging the switch of the main operating circuit open for opening the circuit when the solenoid is deenergized, said stationary and movable contact points connected in said auxiliary circuit whereby the circuit for the solenoid is broken upon expansion of the thermo-responsive element.

2. A temperature control comprising a stationary contact, a movable contact positioned to engage the stationary contact, means for maintaining said movable contact in engagement with said stationary contact, a thermo-responsive element for actuating the movable contact to disengage the stationary contact as the thermo-responsive element expands, means adjusting the actuating means, a main operating circuit and an auxiliary circuit, a switch connected in the said main operating circuit, a solenoid connected in the auxiliary circuit for holding the switch of the main operating circuit closed, and resilient means urging the switch of the main operating circuit open for opening the circuit when the solenoid is deenergized, said stationary and movable contact points connected in said auxiliary circuits whereby the circuit for the solenoid is broken upon expansion of the thermo-responsive element.

3. In a control for maintaining substantially constant temperature in fluids, the combination which comprises a base having an opening therethrough, an inverted U-shaped bracket mounted on the base and positioned over the opening therein, a depending stationary rod carried by the bracket and extended through the opening in the base, a tubular thermo-responsive element positioned on the rod for actuating said rod, a trigger positioned in the bracket and carried on the upper end of the thermo-responsive element, a vertically disposed arm flexibly mounted on the bracket, a movable contact point carried by the arm, a stationary contact point carried by the base and positioned to engage the movable contact point, an electro-magnet carried by the base, a main operating circuit, an auxiliary circuit in which the electro-magnet is positioned, a switch having a bar and contact points positioned in the said main operating circuit, means resiliently suspending the switch bar above the contact points and spaced therefrom, a contact arm positioned to be influenced by the electromagnet to actuate the switch bar to close the main operating circuit, and means adjusting the position of the said switch bar suspending means.

4. In a control for maintaining substantially constant temperature in fluids, the combination which comprises a base having an opening therethrough, an inverted U-shaped bracket mounted on the base and positioned over the opening therein, a depending stationary rod carried by the bracket and extended through the opening in the base, a tubular thermo-responsive element positioned on the rod for actuating said rod, a trigger positioned in the bracket and carried on the upper end of the thermo-responsive element, a vertically disposed arm flexibly mounted on the bracket, a movable contact point carried by the arm, a stationary contact point carried by the base and positioned to engage the movable contact point, an electro-magnet carried by the base, a main operating circuit, an auxiliary circuit in which the electro-magnet is positioned, a switch having a bar and contact points positioned in the said main operating circuit, means resiliently suspending the switch bar above the contact points and spaced therefrom, a contact arm positioned to be influenced by the electro-magnet to actuate the switch bar to close the main operating circuit, means adjusting the position of the said switch bar suspending means, an upper insulated base positioned above the base of the control, a support carried by the upper base on which the switch points and switch bar suspending means are mounted, and means mounting the electro-magnet on the upper base.

ENRIQUE VILLARREAL.

REFERENCES CITED

The following references are of record in the file of this patent:

UNITED STATES PATENTS

| Number | Name | Date |
|---|---|---|
| 1,171,254 | Ruckle | Feb. 8, 1916 |
| 1,571,390 | Apthorpe | Feb. 2, 1926 |
| 2,133,888 | Bloch | Oct. 18, 1938 |
| 2,356,612 | Pfaff | Aug. 22, 1944 |
| 2,369,715 | Classon | Feb. 20, 1945 |